(12) United States Patent
Ueda et al.

(10) Patent No.: US 7,133,855 B2
(45) Date of Patent: Nov. 7, 2006

(54) BEHAVIOR CONTROL APPARATUS AND METHOD

(75) Inventors: Yugo Ueda, Saitama (JP); Hiroshi Tsujino, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 509 days.

(21) Appl. No.: 10/411,485

(22) Filed: Apr. 7, 2003

(65) Prior Publication Data

US 2003/0225464 A1    Dec. 4, 2003

(30) Foreign Application Priority Data

Apr. 8, 2002    (JP) .............................. 2002-105773

(51) Int. Cl.
| G06E 1/00 | (2006.01) |
| G06F 15/18 | (2006.01) |
| G06G 7/00 | (2006.01) |

(52) U.S. Cl. ...................................................... 706/20
(58) Field of Classification Search ............... 700/47; 701/40

See application file for complete search history.

(56) References Cited

U.S. PATENT DOCUMENTS 6,212,466 B1 *   4/2001   Ulyanov et al. ............... 701/99
6,496,761 B1 * 12/2002   Ulyanov et al. ............... 701/37
6,701,236 B1 *   3/2004   Ulyanov et al. ............... 701/40

FOREIGN PATENT DOCUMENTS

| JP | 05-03709 | 2/1993 |
| JP | 05-158907 | 6/1993 |
| JP | 05-204405 | 8/1993 |
| JP | 05-257919 | 10/1993 |
| JP | 05-346915 | 12/1993 |
| JP | 06-301664 | 10/1994 |
| JP | 07-093296 | 4/1995 |
| JP | 09-245012 | 9/1997 |
| JP | 10-091604 | 4/1998 |
| JP | 11-353295 | 12/1999 |

\* cited by examiner

*Primary Examiner*—Anthony Knight
*Assistant Examiner*—Michael B. Holmes
(74) *Attorney, Agent, or Firm*—Fenwick & West LLP

(57) ABSTRACT

It is objective of the invention to provide a highly reliable control apparatus and method which reduces the amount of calculation required for both learning of an input/output relationship and actual control as well as prevent inappropriate outputs from being generated for inputs which have been never learned. According to one aspect of the invention, pairs of an input pattern vector for learning and a target output are distributed to a class based on the target output. Then, a correspondence between each element of the input pattern vector for learning and the target output is learned only in that class, and a distribution function is calculated for distributing a new input pattern vector for learning to that class. After the completion of this learning, the distribution function is used to determine which class a new input pattern vector detected by a sensor belongs to. Finally, an output is calculated according to the learning result of that class. Therefore, since the range of the outputs corresponding to the inputs may be limited, reliability of the control is improved.

16 Claims, 13 Drawing Sheets

BEHAVIOR CONTROL APPARATUS AND METHOD

TECHNICAL FIELD

The invention relates to a behavior control apparatus and method using a neural network, and more specifically to a behavior control apparatus and method for calculating control outputs based on inputs provided to an object to be controlled.

BACKGROUND OF THE INVENTION

Some methods are well known for stably controlling an object. In those methods, a relationship between an input and an output is first obtained by learning and an output is then provided to the object to be controlled (hereinafter referred to as "controlled object") based on the learning result. Some functions which properly represent the input/output relationship are created and used for the control. For creating the functions, layered neutral network such as perceptron, RBF network and CMAC (cerebellar model arithmetic computer) are used, for example.

In perceptron, three layers including an input layer, a middle layer and an output layer are generally provided. Then, learning is conducted as follows: first, an output obtained by entering an input to perceptron is compared with an actual output (that is, a teacher signal); then, the error between those outputs is reflected to coupling load and threshold values of the perceptron. One example of a control apparatus using such neural network is disclosed in Japanese unexamined patent publication (Kokai) No.09-245012.

In RBF network, a nonlinear function for representing the input/output relationship is calculated as an output from the network by linearly connecting outputs of basis functions on a middle layer, A Gaussian function is generally used as the basis function on the middle layer.

In the perceptron, it is necessary to prepare a large amount of data set of inputs and outputs for realizing reliable control. In addition, since sigmoid functions are used as the input/output function on a middle layer in multilayer perceptron, output from the middle layer will take a large output value in response to a large input value. Thus, when an input within the range where the learning has not been conducted is provided, an inappropriate output may be generated which is totally different from a desired one. Such inappropriate outputs may lead to a serious accident (for example, roll or crash) for a controlled object such as a helicopter.

On the other hand, since the input/output functions on the middle layer are Gaussian functions in the RBF network, the input/output functions will take large output value only for local range in a input space and will take no unexpected output in contrast to the perceptron. However, since the input/output relationship is represented by a linear combination of multiple Gaussian functions in the RBF network, it is necessary to learn the ratio for all Gaussian functions (classes) and to output calculation results of all classes for a certain input. Consequently, the calculation load becomes relatively large.

Therefore, there is a need for a highly reliable control apparatus and method for reducing the amount of calculation required for both learning of an input/output relationship and for actual control as well as preventing inappropriate outputs from being generated for inputs which have been never learned.

SUMMARY OF THE INVENTION

A behavior control apparatus according to the invention comprises:

an input unit for creating pairs of an input pattern vector for learning and a target output, wherein said input pattern vector for learning includes inputs detected by a sensor and outputs provided to a controlled object as its elements;

a first distributing unit for distributing said pair of the input pattern vector for learning and the target output to one of two or more classes based on the target output;

a learning unit for learning correspondence between each element in the input pattern vector for learning and the target output in the class where said pair of the input pattern vector and the target output are distributed by said first distributing unit;

a second distributing unit for distributing new input pattern vector into one of said classes according to learning result in said learning unit; and an output processing unit for calculating an output corresponding to said new input pattern vector according to said learning result in the class where said new input pattern vector is distributed by said second distributing unit, wherein the output is provided to said controlled object.

According to one aspect of the invention, pairs of the input pattern vector for learning and the target output are distributed to a class based on the target output. Correspondence between each element of the input pattern vector for learning and the target output is learned only in that class, and a distribution function is calculated for distributing a new input pattern vector for learning to that class. After the completion of this learning, the distribution function is used to determine which class a new input pattern vector detected by a sensor belongs to. Finally, an output is calculated according to the learning result of that class. Therefore, since the range of the outputs corresponding to the inputs may be limited, reliability of the control is improved. The new input pattern vector is also referred to as a test pattern vector in description of preferred embodiments of the invention. The distribution function refers to Equation (2) described later, for example.

Though the classes may be created beforehand, it is preferable to determine the classes based on the density of distribution of the target outputs. In the latter case, efficiency of learning and control is improved since there is flexibility such as increasing the number of classes in the range having high density of the output. In this case, creating the classes may be done either manually or automatically. When the creating the classes is done automatically, it is preferable to use a self-organizing method such as Kohonen's self-organizing map.

The input pattern vector for learning may include as elements an input detected by the sensor and an output provided to the controlled object at a present time, and an input detected by the sensor and an output to the controlled object at a time preceding the present time. An output in the future may be used for the target output as a teacher signal. Thus, more appropriate control may be realized by considering a certain delay time because the input and the output at the same time do not correspond to each other due to the inertia of the controlled object and the response time of an operator.

The learning unit stores each element of the input pattern vectors for learning and the target outputs distributed to each class respectively, and then calculates mean and variance of normal distribution for each data set of the each element and the target output. The second distributing unit calculates a distance from the mean of each normal distribution to each element of the new input pattern vector for all classes, and distributes the new input pattern vector to the class which yields smallest mean of the distances. The calculation of the distance refers to Equation (1) in Step S704 described later, for example.

Though the mean of the distances may be a simple arithmetic mean, it is preferable to employ a weighted mean using weights for each element of the input pattern vector for learning with respect to the target output. The weight is calculated based on learning with a neural network with the target output as a teacher signal. The calculation of the weighted mean refers to Equation (2) in Step S704 described later, for example.

The output processing unit calculates a weighted mean of distances between mean of each normal distribution in the class where the new input pattern vector is distributed and each element of the new test pattern vector, the output processing unit outputting a value at a distance corresponding to the weighted mean separated from the mean of the normal distribution of the target output. This operation refers to Equation (3) in Step S708 described later, for example.

DETAILED DESCRIPTION OF THE PREFERRED EMBODIMENTS

Figure 1A:
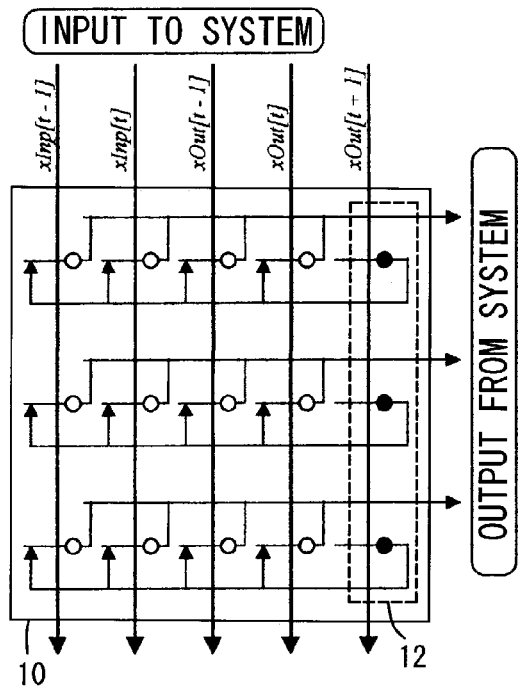
FIGS. 1A to 1C are explanatory views of a principle of the invention.

First, principle of the invention is described with reference to FIGS. 1A to 1C. The present invention may be viewed as an engineering interpretation of information process in the human brain. In FIG. 1A, system 10 obtains multiple inputs ($xInp[t-1]$, $xInp[t]$, $xOut[t-1]$, and $xOut[t]$) and an output $xOut[t+1]$ during pre-process. The output $xOut[t+1]$ is a target of output generated by the system 10. Cells 12 which respond to the output $xOut[t+1]$ uniquely are then created in a self-organizing way. These cells 12 are referred to as "trigger cells".

Figure 1B:
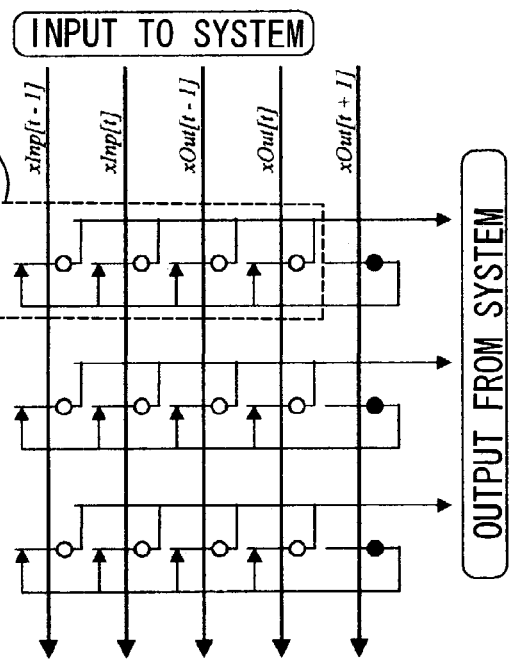
Figure 1C:
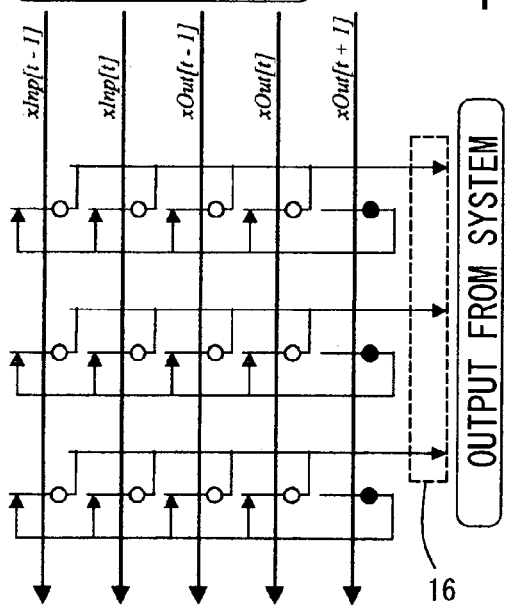

Referring to FIG. 1B, one of the trigger cells 12 activates cells 14 belonging to the same class as itself, and makes each of cells 14 collect inputs ($xInp[t-1]$, $xInp[t]$, $xOut[t-1]$, and $xOut[t]$) to the system 10. These cells 14 are referred to as "input processing cells". The input processing cell 14 works to represent the distribution of the inputs collected by that cell. A combination of the trigger cell 12 and the input processing cells 14 activated by this trigger cell is collectively referred to as a class.

After the completion of the process described above, the system 10 can calculate an output based on the inputs to the system 10 without the trigger cell 12. Referring to FIG. 1C, when inputs are provided to the system 10, the inputs are collected by the input processing cells 14 in all classes. The input processing cells 14 in each of the classes calculate the distance between the input and the center of the distribution created beforehand. The class which includes the input processing cell 14 having the shortest distance is selected, and the trigger cell 12 in the selected class calculates the output 16 based on the distribution of the output $xOut[t+1]$.

Now preferred embodiments of the invention which employs the principle described above will be described.

Figure 2:
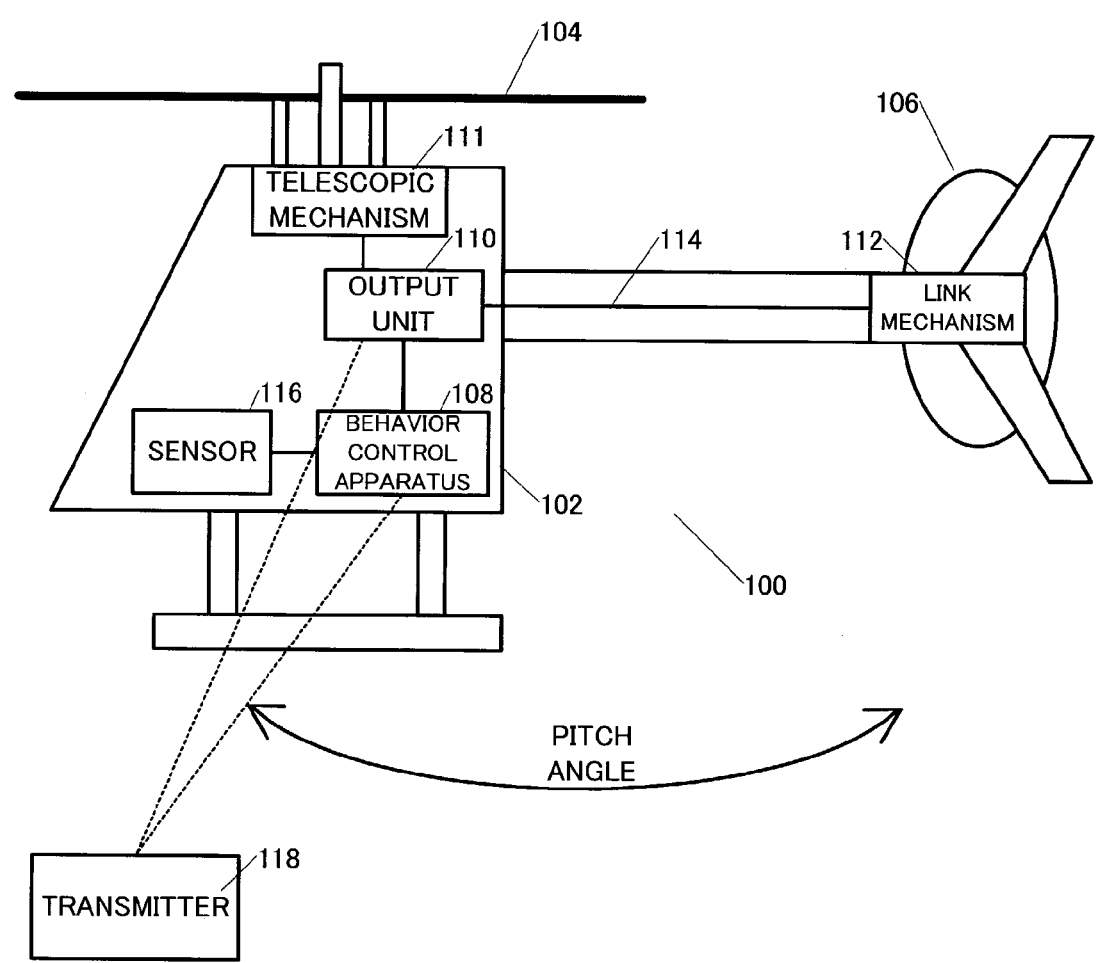
FIG. 2 is a conceptual view of a helicopter control system according to one embodiment of the invention.

FIG. 2 shows an example of a control system which applies a behavior control apparatus according to the invention. A radio-controlled helicopter (hereinafter referred to as a "helicopter") 100 as a controlled object includes a fuselage 102, a main rotor 104, and a tail rotor 106. The helicopter 100 hovers in the air by means of the rotation of the main rotor 104 and the tail rotor 106.

On the fuselage 102 are mounted a behavior control apparatus 108 and an output unit 110 such as a servo motor. At the base of the main rotor 104 or the tail rotor 106, a rotor-tilting mechanism 111 or a link mechanism 112 are provided respectively, which are connected to the output unit 110 through a rod 114 or the like.

A sensor 116 is mounted on the fuselage 102 and detects a pitch angle of the fuselage 102. The sensor 116 may be a visual sensor capable of determining the pitch angle from captured images as well as a sensor directly detecting the pitch angle such as a gyroscope.

The behavior control apparatus 108 and the output unit 110 are designed to receive a radio signal from a transmitter 118 through a receiver (not shown). The behavior control apparatus 108, the output unit 110 and the sensor 116 may be connected to each other wirelessly or through a wired link. Alternatively, the behavior control apparatus 108, the output unit 110 and the sensor 116 may be integrated into a single device. Further alternatively, one of the behavior control apparatus 108, the output unit 110 and the sensor 116 may be installed outside the helicopter 100. In this case, they are connected wirelessly each other.

When an operator observes the behavior of the helicopter 100 and operates the transmitter 118 to stabilize the helicopter, an output signal is transmitted to the output unit 110. The term "stabilize" means to control the helicopter 100 not swinging to pitch direction herein. Motion in other directions such as yaw direction is not considered in this example. The output unit 110 drives the rotor-tilting mechanism 111 to tilt the main rotor 104 according to the output signal from the transmitter 118, thereby changing the inclination of the helicopter 100 in the pitch direction. It should be noted that the direction is not limited to the pitch direction but various directions may be controlled in other applications.

Both inputs of the pitch angle detected by the sensor 116 and output provided by the operator through the transmitter 118 are provided to the behavior control apparatus 108. The behavior control apparatus 108 makes a pair of an input pattern for learning (hereinafter referred to as "learning pattern") constituted by the inputs and the output and a target output corresponding to this input pattern. Then the behavior control apparatus 108 distributes the pair to one of two or more classes based on the target output. A correspondence between the learning pattern and the target output is learned only in the class where the pair is distributed. A series of processes described above is referred to as "preparation stage" hereinafter.

After the completion of the preparation stage, the behavior control apparatus 108 may create for the output unit 110 a proper output based on inputs detected by the sensor 116 without the operation by the operator, and thus the helicopter 100 may be controlled sensitive for stability. In other words, when an new input pattern for test (hereinafter referred to as a "test pattern") is provided, the behavior control apparatus 108 distributes the test pattern to one of the classes. Then the behavior control apparatus 108 calculates a proper output for stabilizing the helicopter 100 (that is, the controlled object) according to the learning result in the class where the test pattern is distributed. The calculation result is presented to the output unit 110. A series of processes described above is referred to as "control stage" hereinafter.

The behavior control apparatus 108 of the invention may be applied to various controlled objects which include a driving mechanism and may move by itself. The controlled object is not limited to flying objects such as the helicopter 100 but includes a vehicle and a robot arm. However, as described later, the invention is more useful when it is applied to a controlled object such as the helicopter 100 which needs to be controlled sensitive for stability. Further, the objective of the invention is not limited to the stable control.

Figure 3:
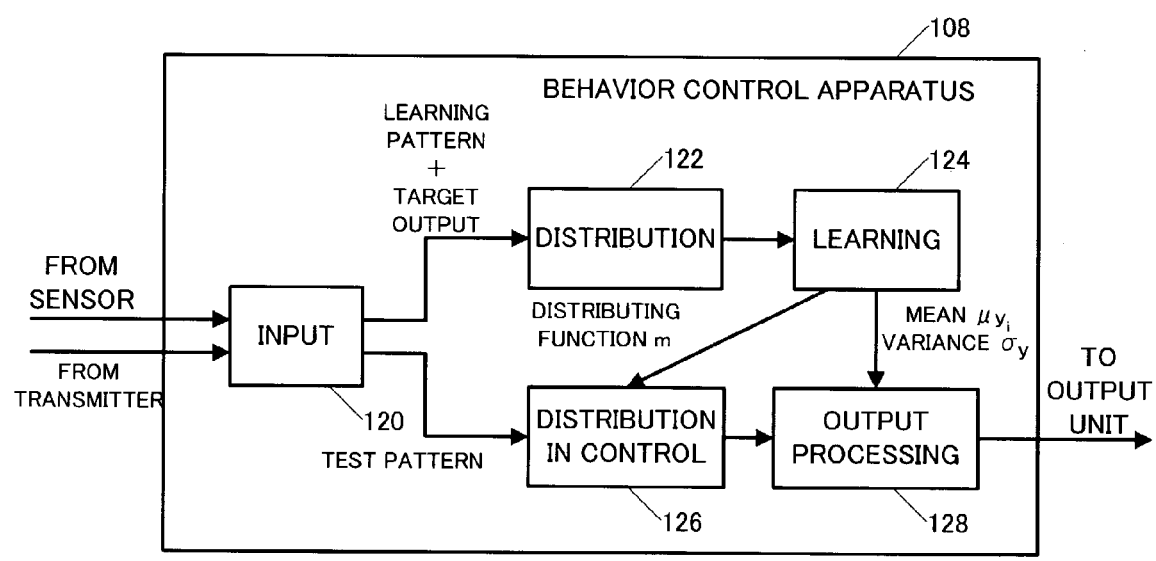
FIG. 3 is a functional block diagram of a behavior control apparatus according to the invention.

FIG. 3 is a functional block diagram of the behavior control apparatus 108. In a preparation stage, an input unit 120 combines inputs at multiple points of time detected by the sensor 116, and outputs at multiple points of time provided by the operator to the output unit 110 to create a pair of a learning pattern and a corresponding target output, and provides the pair to a distributing unit 122. A distribution unit 122 distributes the pair of the learning pattern and the corresponding target output to one of two or more classes. A learning unit 124 learns a correspondence between the learning pattern and the corresponding target output in the class where the pair is distributed. The result of this learning is used by to distribution in control unit 126 and an output processing unit 128.

In a control stage, the input unit 120 combines inputs at multiple points of time detected by the sensor 116 and the outputs generated by the behavior control apparatus 108 to create a test pattern, and provides the test pattern to the distribution in control unit 126. The distribution in control unit 126 uses the learning result created by the learning unit 124 to distribute the test pattern to one of the classes. The output processing unit 128 uses the learning result corresponding to the class where the test pattern is distributed to calculate an output corresponding to the test pattern.

Figure 4:
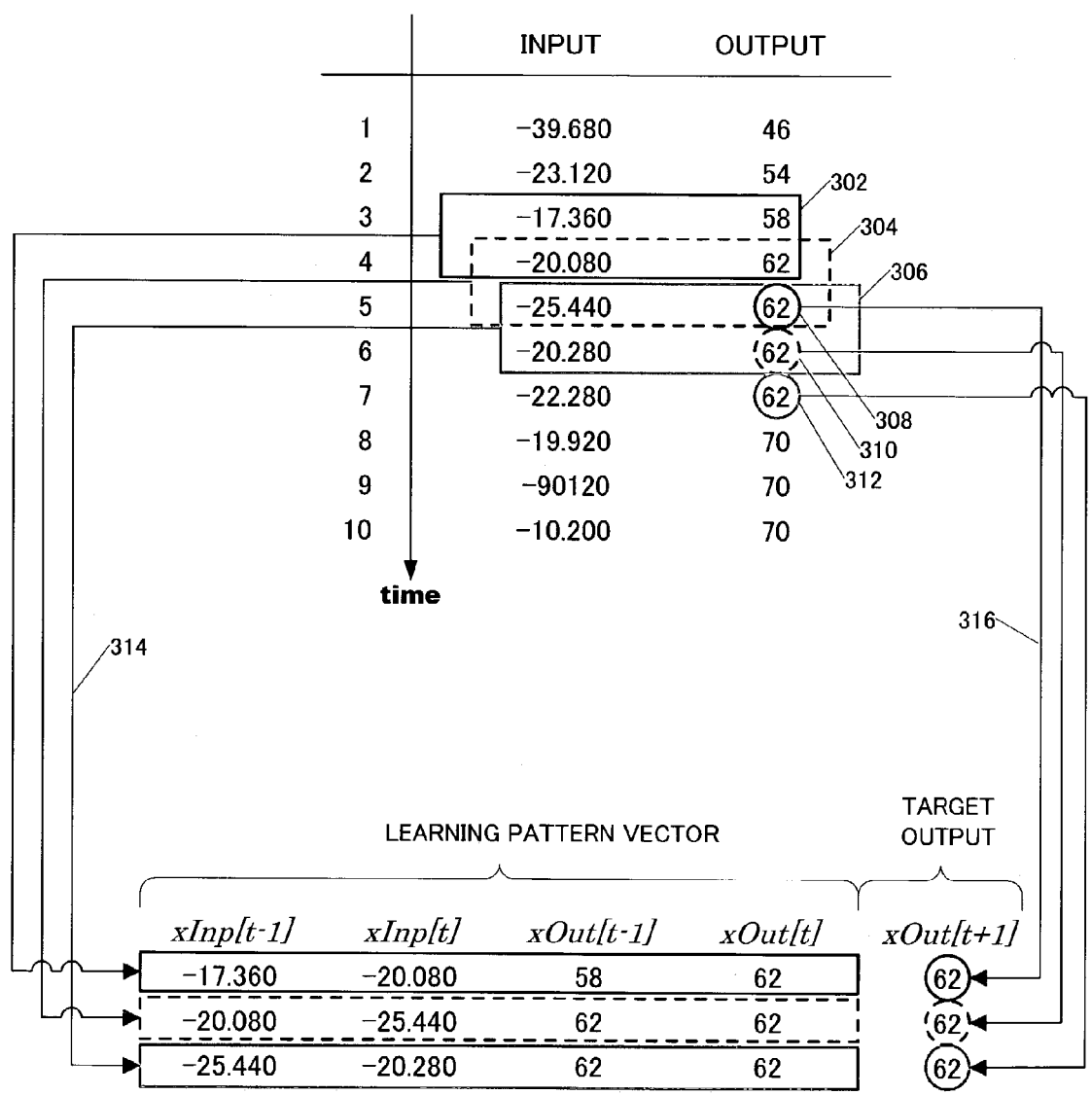
FIG. 4 shows relationship between a learning pattern vector and a target output.

FIG. 4 shows an example of inputs and outputs included in a learning pattern. In this example, each input is a pitch angle of the helicopter 100 detected by the sensor 116. The pitch angle is 0° when the helicopter 100 is stable (that is, the helicopter 100 hovers horizontally). The pitch angle takes a negative value when the helicopter 100 tilts forward and takes a positive value when backward. The output is an output signal provided to the output unit 110 by the operator for changing the pitch angle to stabilize the helicopter 100. In this example, the output takes an integer value ranging from 1 to 127. As the output comes close to "1", the force of leaning the helicopter 100 forward is increased, and as the output comes close to "127", the force of leaning the helicopter 100 backward is increased.

The inputs are detected by the sensor 116 at predetermined intervals (for example, 0.05 second) and stored in memory (not shown) together with the output provided to the output unit 110 at the same timing. Then, the inputs and the output are combined to create the learning pattern.

Figure 5:
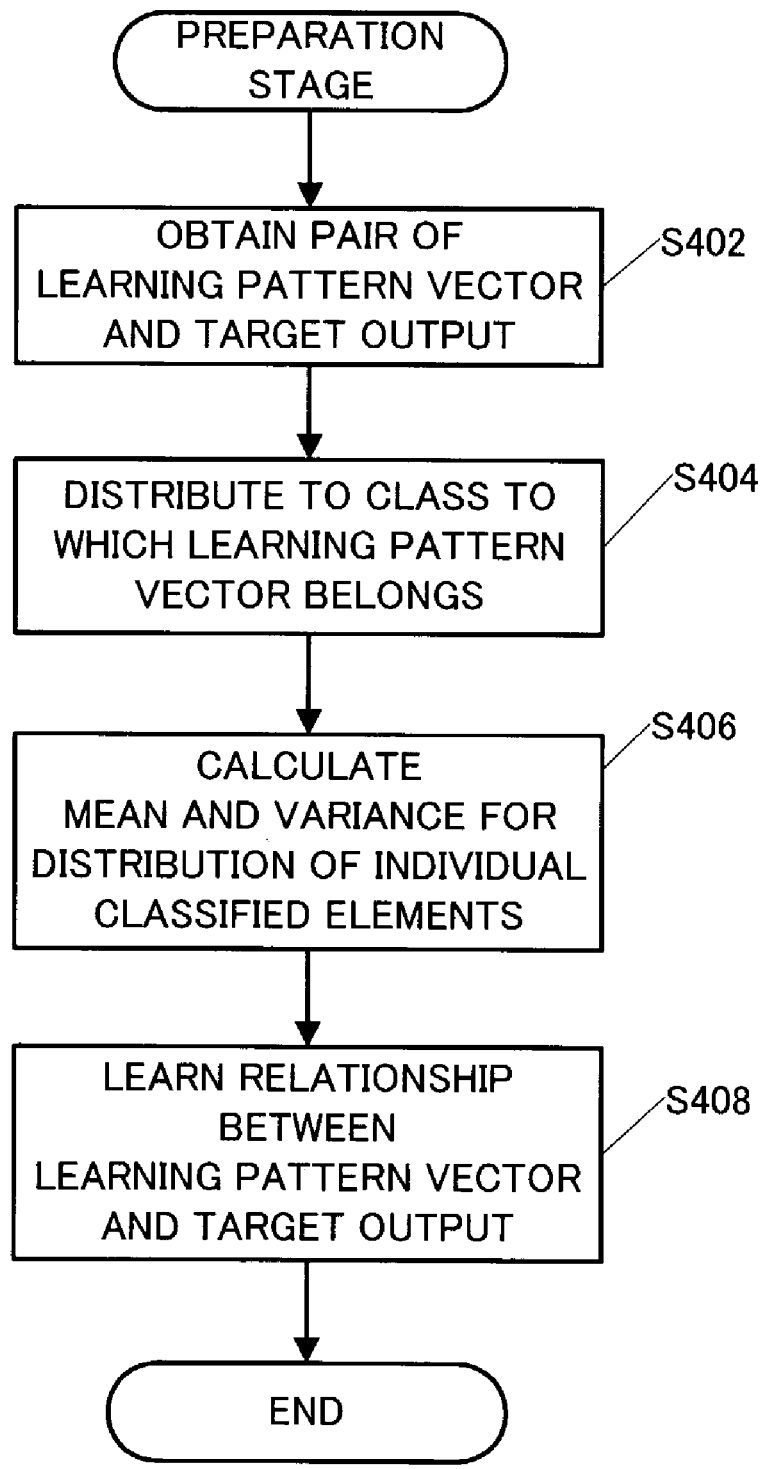
FIG. 5 is a flowchart of a preparation stage of behavior control method.

Referring to a flowchart shown in FIG. 5, the operation of the behavior control apparatus 108 in the preparation stage will be described.

First, the input unit 120 creates a pair of a learning pattern and a corresponding target output (S402). An example of the pair of the learning pattern and the corresponding target output is described with reference to FIG. 4. Suppose that an input detected by the sensor 116 at certain time t be represented as xInp[t] and an output provided to the output unit 110 at that time be represented as xOut[t]. In this example, the learning pattern includes an input xInp[t], an output xOut[t] at time t and an input xInp[t−1], an output xOut[t−1] at time t−1 preceding the time t. Among the inputs and outputs arranged in the chronological order in FIG. 4, four values (302) framed in a rectangular are designated as one learning pattern. An output xOut[t+1], which is an output at a time t+1 succeeding the time t and is enclosed by a circle 308 in FIG. 4, is used as a target output for this learning pattern. In the same way, a pair of a learning pattern and a corresponding target output (such as a pair of a rectangle 304 and a circle 310, a pair of a rectangle 306 and a circle 312 (indicated by arrows 314 and 316, respectively)) is created sequentially. In other words, the learning pattern is a four-dimensional feature vector including xInp[t−1], xInp[t], xOut[t−1] and xOut[t] as its elements. FIG. 4 also shows pairs of the learning pattern and the corresponding target output as a table format.

In this embodiment, it is preferable as described above that the learning pattern includes input and output at the previous time t−1 in addition to input and output at the present time t, and output not at the present time t but at the time t+1 is adopted as the target output. The reason of this is as follows; generally, there is a delay time between input and output due to the inertia of a controlled object and the reaction time of an operator or the like. Therefore, by considering the delay time in the pair of the learning pattern and the corresponding target output, the behavior of the controlled object may be well reflected to the relationship between the learning pattern and the target output.

It should be noted that it is not always preferable to constitute the learning pattern as described above for any application. The number of inputs or outputs included in the learning pattern, how apart the previous time or subsequent time used for the learning pattern is apart from the present time, and which output is adopted as the target output are design choices according to characteristics of the controlled object or the like. The more elements are used to constitute the learning pattern, the more sophisticated learning result becomes in a preparation stage, thereby leading to precise stable control in a control stage.

The present invention can be applied to a learning pattern where the learning data is not created over time but is created according to different modalities.

In the following description, suppose that k-th learning pattern is represented as vector $X_k=\{x_{k1}, \ldots, x_{kJ}\}$ (k=1, . . . , K) when the sensor 116 detects a total of K learning patterns each including J elements (namely a J-dimensional feature vector), and an target output corresponding to the learning pattern is represented as $y_k$.

The distributing unit 122 distributes the learning pattern vector $X_k$ to one of two or more classes based on the value of the target output $y_k$ (S404). These classes may be created beforehand. However, it is preferable to arrange the classes such that each of the classes contains approximately the same number of outputs according to the extent of the frequency distribution of outputs provided by the operator in a preliminary experiment using the helicopter 100.

More specifically, though the output may take a integer value from 1 to 127 in this embodiment, if the range from 1 to 127 is equally divided into three classes, the first and the third classes will not have much significance. The reason is as follows; since the case may hardly occurs where an extreme output value close to 1 or 127 is provided to the output unit 110 of the helicopter 100, it may be expected that in the actual control almost all of the output provided by the operator are values around the middle range of 1 to 127. Therefore, the classes are preferably created such that three classes are arranged close to one another in the range where the output distribution has high density. This arrangement of the class may be conducted manually or otherwise using a Kohonen's self-organizing map or the like.

The time required for learning becomes longer as the number of classes increases. Insufficient number of classes will result in a low precision control. Therefore, it is necessary to establish a proper number of classes. For the sake of simplicity, it is assumed that two classes are established in the following description. Class 1 corresponds to target outputs ranging from 1 to 63, and class 2 corresponds to target outputs ranging from 64 to 127. It should be noted that the number of classes may be a different number more than two. For example, the number of classes is set to eight in the example described later (see FIGS. 12A and 12B).

Steps S402 through S404 may be conducted every time a single pair of the learning pattern and the target output is obtained, or may be conducted after a certain number of pairs of the learning pattern and the target output have been accumulated.

In Step S406, the learning unit 124 stores into dedicated memory areas the elements $x_{kj}$(j=1, . . . , J) of the learning pattern vector $X_k$ and the target output $y_k$ which are distributed to each class. After a certain quantity of the data has been accumulated, the frequency distributions of the data are created and then mean $\mu$ and variance $\sigma$ of these data are calculated by assuming the distribution of the data as normal distribution. The calculated mean $\mu$ and the variance $\sigma$ are stored for each of the elements $x_{kj}$ and the target output $y_k$ for every class.

Figure 6:
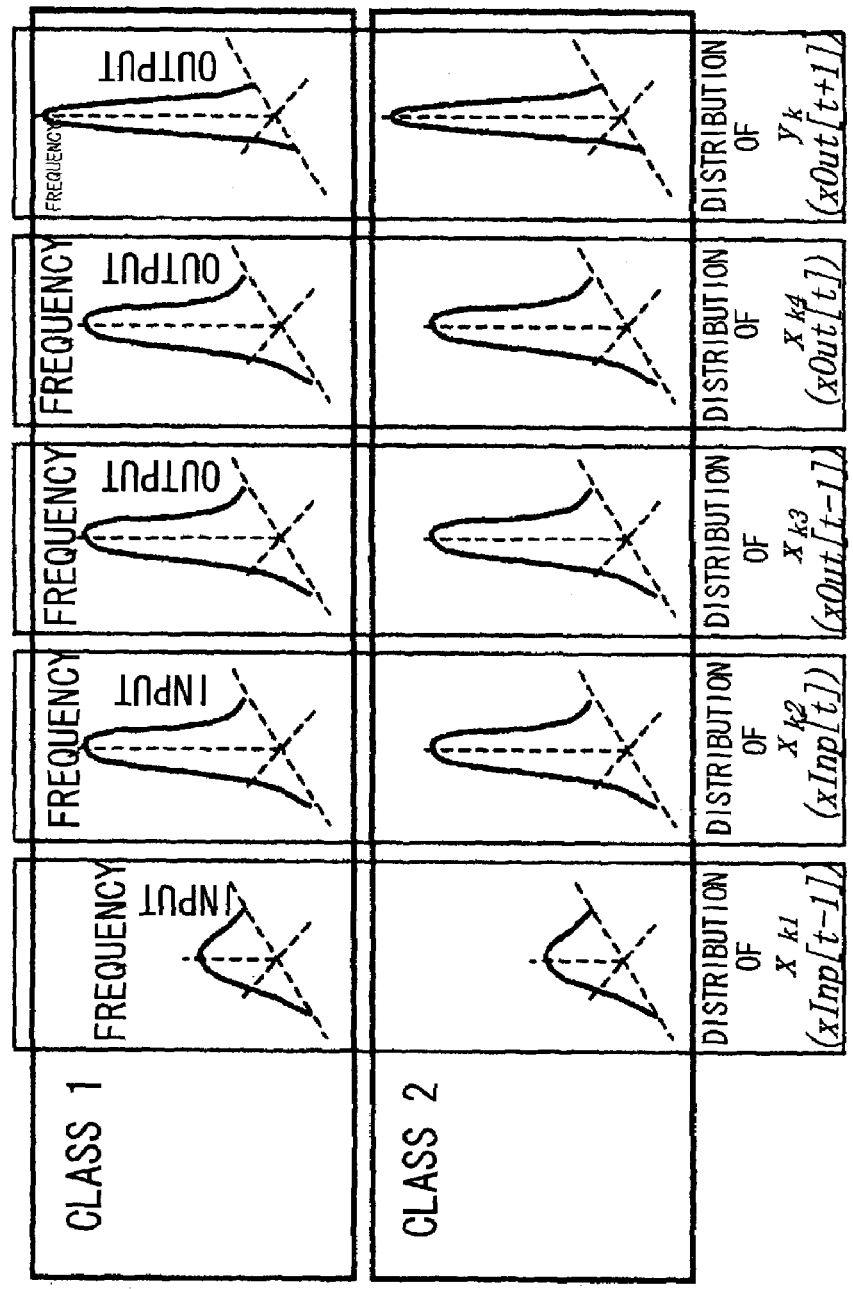
FIG. 6 shows an example of normal distributions of each element of the learning pattern vector and the target output.

FIG. 6 shows the operations in Step S406 conceptually. The upper block corresponds to the class 1, and the lower block corresponds to the class 2. The columns arranged from left to right correspond to the distributions of the each elements $x_{kj}$ of the learning pattern vector and the target output $y_k$ when J=4.

Suppose that the number of the classes is represented as i (i=1 to I), the mean or the variance of the normal distribution of each elements $x_{kj}$ are represented as $\mu_{ij}$ or $\sigma_{ij}$ respectively, and the mean or the variance of the normal distribution of the target output $y_k$ in the i-th class are represented as $\mu_{y_i}$ or $\sigma_{y_i}$, respectively. In this case, corresponding to each normal distributions shown in FIG. 6, $\mu_{ij}$, $\sigma_{ij}$ or $\mu_{y_i}$, $\sigma_{y_i}$ are stored.

In Step S408, the learning unit 124 learns the correspondence between each element $x_{kj}$ of the learning pattern vector $X_k$ and the target output $y_k$. This learning is conducted in the following process based on well known Perceptron learning rules. The following process is conducted for each class.

1. First, a distance $z_{ij}$ between each element $x_{kj}$ of the learning pattern vector $X_k$ and the center of the normal distribution (namely, the mean $\mu_{ij}$) obtained in Step S406 for the element in the class i, where the learning pattern vector $X_k$ is distributed, is calculated using the mean $\mu_{ij}$ and the variance $\sigma_{ij}$ by the following equation:

$$z_{ij}=(x_{kj}-\mu_{ij})/\sigma_{ij} (j=1, \ldots, J) \qquad (1)$$

Figure 7:
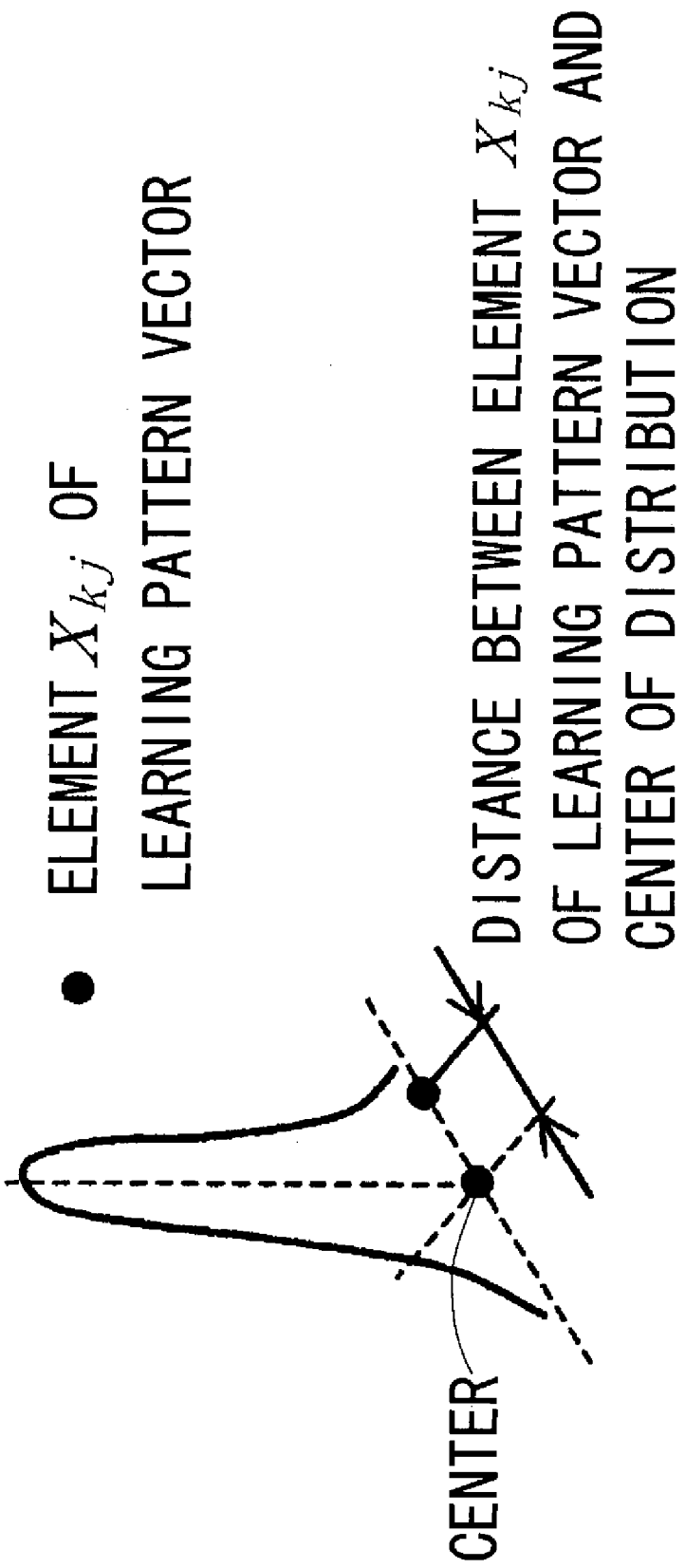
FIG. 7 is an explanatory view of distances between an element of the learning pattern vector and the center of the normal distribution shown in FIG. 6.

$z_{ij}$ corresponds to the distance between each element $x_{kj}$ and the center of the normal distribution (see FIG. 7) normalized by the variance $\sigma_{ij}$.

2. A weighted mean $m_i$ is calculated by dividing a sum of products of the distance $z_{ij}$ and a weight $w_{ij}$ corresponding to the $z_{ij}$ by the number of dimensions J.

$$m_i=\Sigma(z_{ij}w_{ij})/J (j=1, \ldots, J) \qquad (2)$$

The initial value of the weight $w_{ij}$ is selected randomly.

3. The weighted mean $m_i$ is used to calculate an output $y_k'$ by the following equation:

$$y_k'=m_i \cdot \sigma_{y_i}=\mu_{y_i} \qquad (3)$$

4. The weights $w_{ij}$ are updated so as to reduce an error (namely, $y_k'-y_k$) with respect to the obtained $y_k'$ using the target output $y_k$ as a teacher signal.

The calculation described above is conducted for all learning pattern vectors $X_k$ distributed to each classes i (i=1, . . . , I). Thus, the correspondence between the learning pattern vector $X_k$ and the target output $y_k$ has been learned by updating the weight $w_{ij}$.

The learning result calculated in the preparation stage is transmitted to the distribution in control unit 126 and the output processing unit 128, where the learning result is used for the calculation in the control stage. Especially, $m_i$ in Equation (2) is used also as a distribution function for distributing the test pattern vector to the class.

The calculation (1) to (3) in Step S408 is conducted in consideration that there is a correlation between the distance $z_{ij}$ from each element $x_{kj}$ to the center of its normal distribution in FIG. 6 and the distance from the output $y_k$ to the center of its normal distribution. The calculation may correspond to expressing a contribution to the output $y_k$ by the weight $w_{ij}$, of the input (xInp[t−1], xInp[t]) and the output (xOut[t−1], xOut[t]) at the present time t and the previous time t−1, which are the elements of the learning pattern vector.

Since the calculation of the weight $w_{ij}$ at Step S408 is an optional step for a high precision control, it is not necessary to conduct the learning by the perceptron. In this case, the weight $w_{ij}$ is set to 1.

As described above, the preparation stage includes the three processes: first, the behavior control apparatus 108 creates classes corresponding to the target output (first learning). Then, a pair of the learning pattern vector and the target output is distributed to one of the classes, and a normal distribution is calculated for each element (second learning).

Finally, the relationship between each element of the learning pattern vector and the target output is learned by updating weight $w_{ij}$ (third learning).

Figure 8:
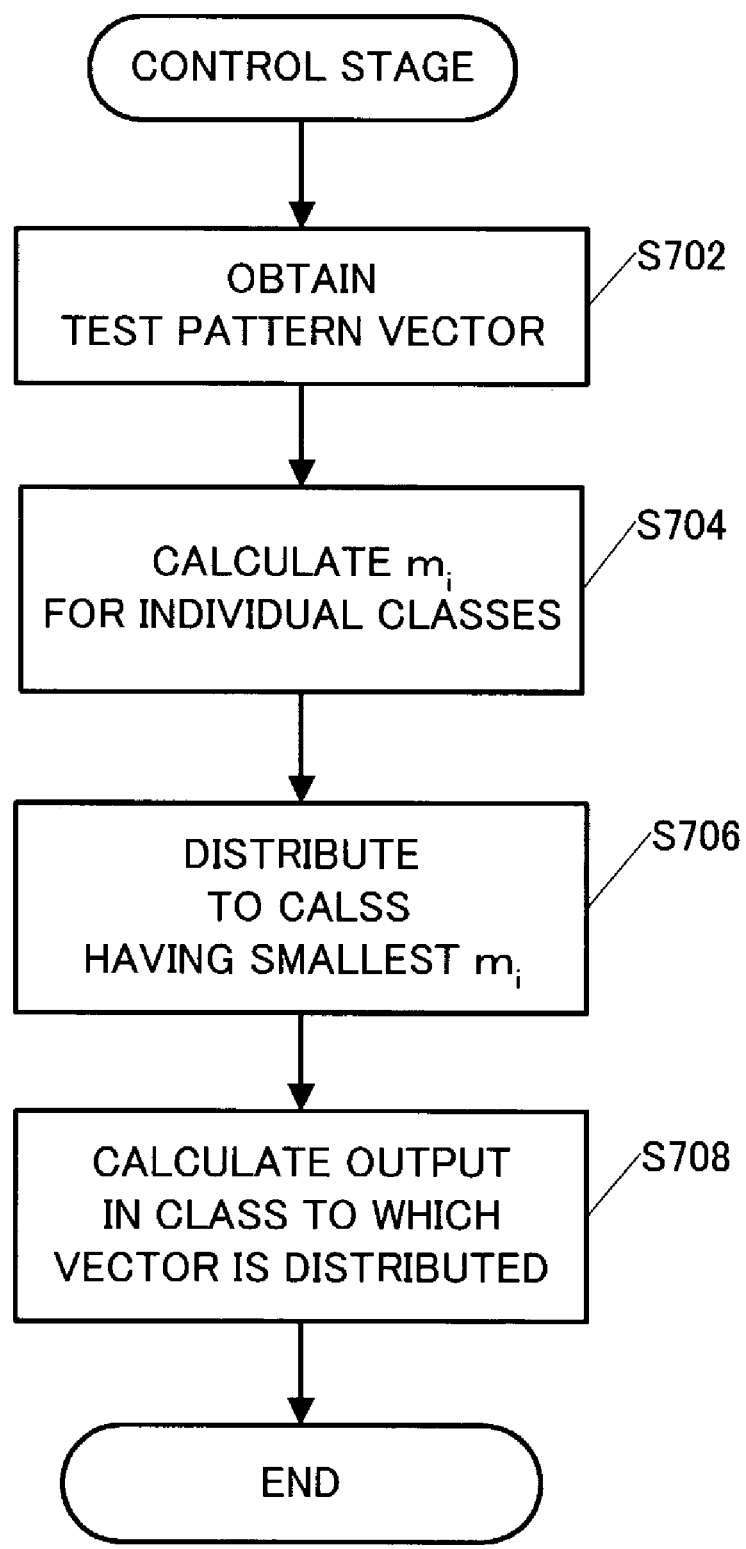
FIG. 8 is a flowchart of a control stage of behavior control method.

Referring to a flowchart shown in FIG. 8, the operation of the behavior control apparatus 108 in the control stage will be described.

In Step S702, the input unit 120 creates a test pattern vector $X_k = \{x_{k1}, \ldots, x_{kJ}\}$, which has the same constitution of inputs and outputs as the learning pattern vector.

In Step S704, the distributing in control unit 126 uses each element $x_{kj}$ (j=1, ..., J) of the test pattern vector to calculate mean $m_i$ of distances for each class i (i=1, ..., I) according to Equations (1) and (2).

In Step S706, the distributing in control unit 126 distributes the test pattern vector $X_k$ to a class which yields the lowest mean of distances $m_i$ (hereinafter this class is referred to as class "iWinner").

In Step S708, the output processing unit 128 uses the mean of distances $m_{iWinner}$ for the class iWinner, the mean $\mu_{iWinner, j}$ and the variance $\sigma_{iWinner, j}$ corresponding to the class iWinner to calculate an output $y_k'$ according to Equation (3). The output $y_k'$ is transmitted from the behavior control apparatus 108 to the output unit 110, thereby the helicopter 100 is controlled.

Figure 9:
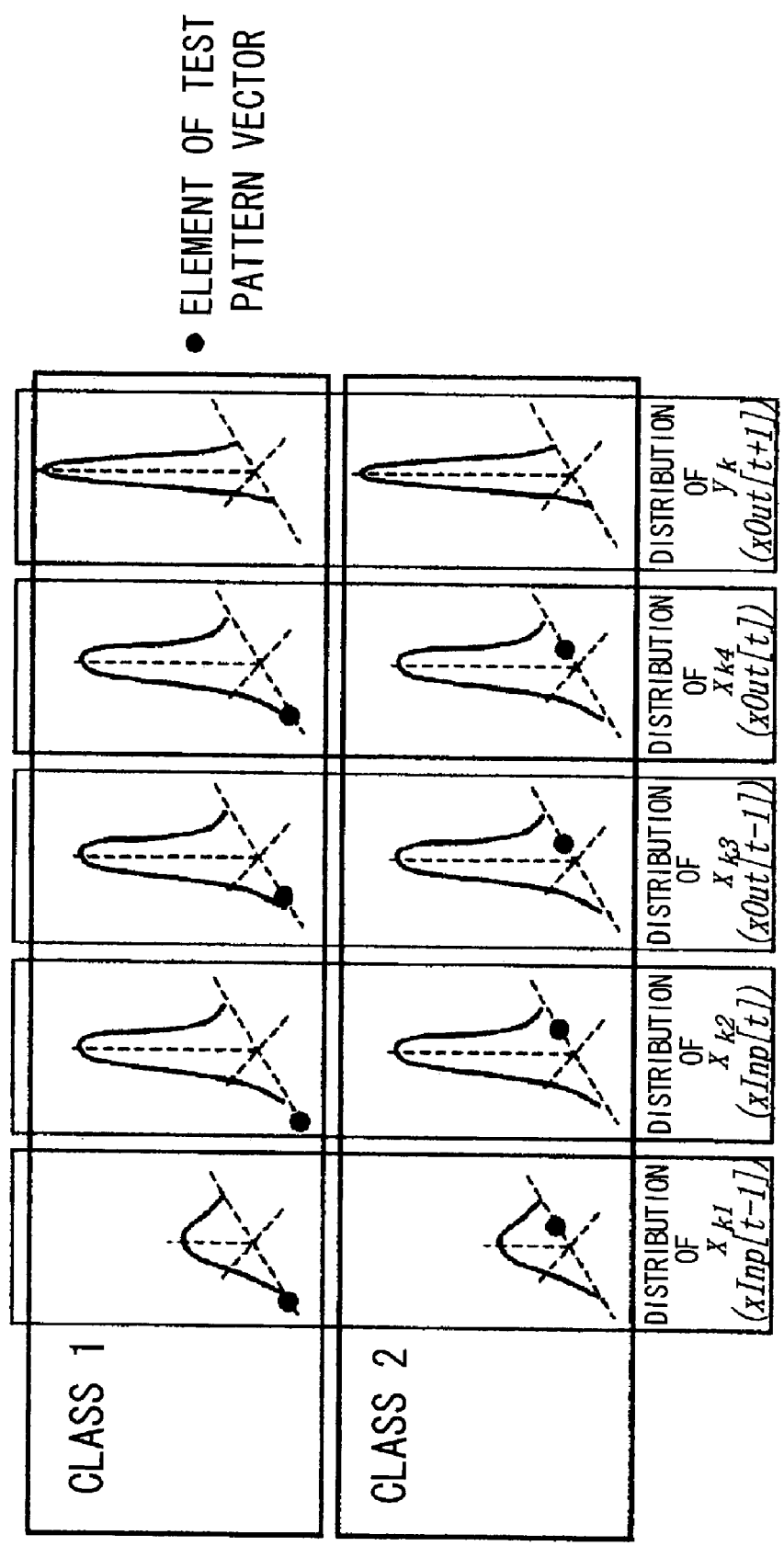
FIG. 9 is an explanatory view of distribution of a test pattern vector to a class.
Figure 10:
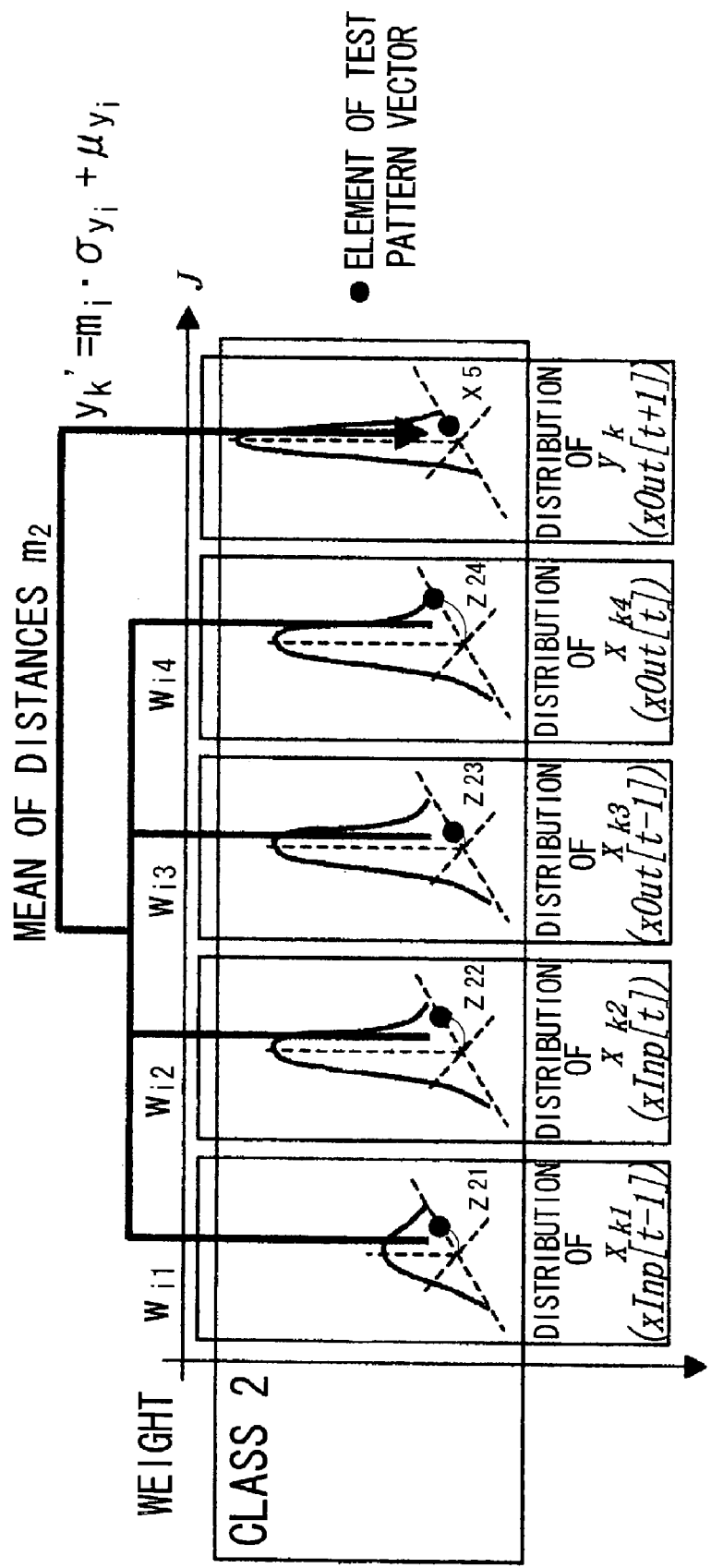
FIG. 10 is an explanatory view of calculation of an output in a class to which a test pattern vector is distributed.

FIG. 9 and FIG. 10 explains the operation in Steps S702 to S708 conceptually. FIG. 9 shows a state where each element $x_{kj}$ (j=1, ..., J) (indicated as a black circle in FIG. 9 and FIG. 10) of the test pattern vector $X_k$ are provided to class 1 and 2. Each elements $x_{kj}$ exist close to the foot of the normal distribution in class 1. On the other hand, they exist close to the mean of the normal distribution (that is, center) in class 2. Therefore, since the mean $m_i$ of the distances is smaller in class 2 than in class 1, the distributing in control unit 126 distributes this test pattern vector $X_k$ to class 2.

The output $y_k'$ is then calculated given that the mean $m_i$ of the distances for the selected class 2 corresponds to the distance from the mean of the normal distribution (center) of the target outputs $y_k$ (see FIG. 10).

It should be noted that it is possible to immediately start the control without going through the preparation stage although in the description above the control with a test pattern initiates after the completion of the preparation stage using a set of pairs of the learning pattern and the target output. Without the preparation stage, both the process in the flowchart shown in FIG. 5 and the process in the flowchart shown in FIG. 8 would be executed concurrently. In such a case, while the learning is immature at the beginning of the control, the controlled object could be damaged due to an unexpected motion. Therefore, it is preferable that the behavior control apparatus 108 should be designed to limit the range of the output provided to the controlled object during a certain period.

Figure 11:
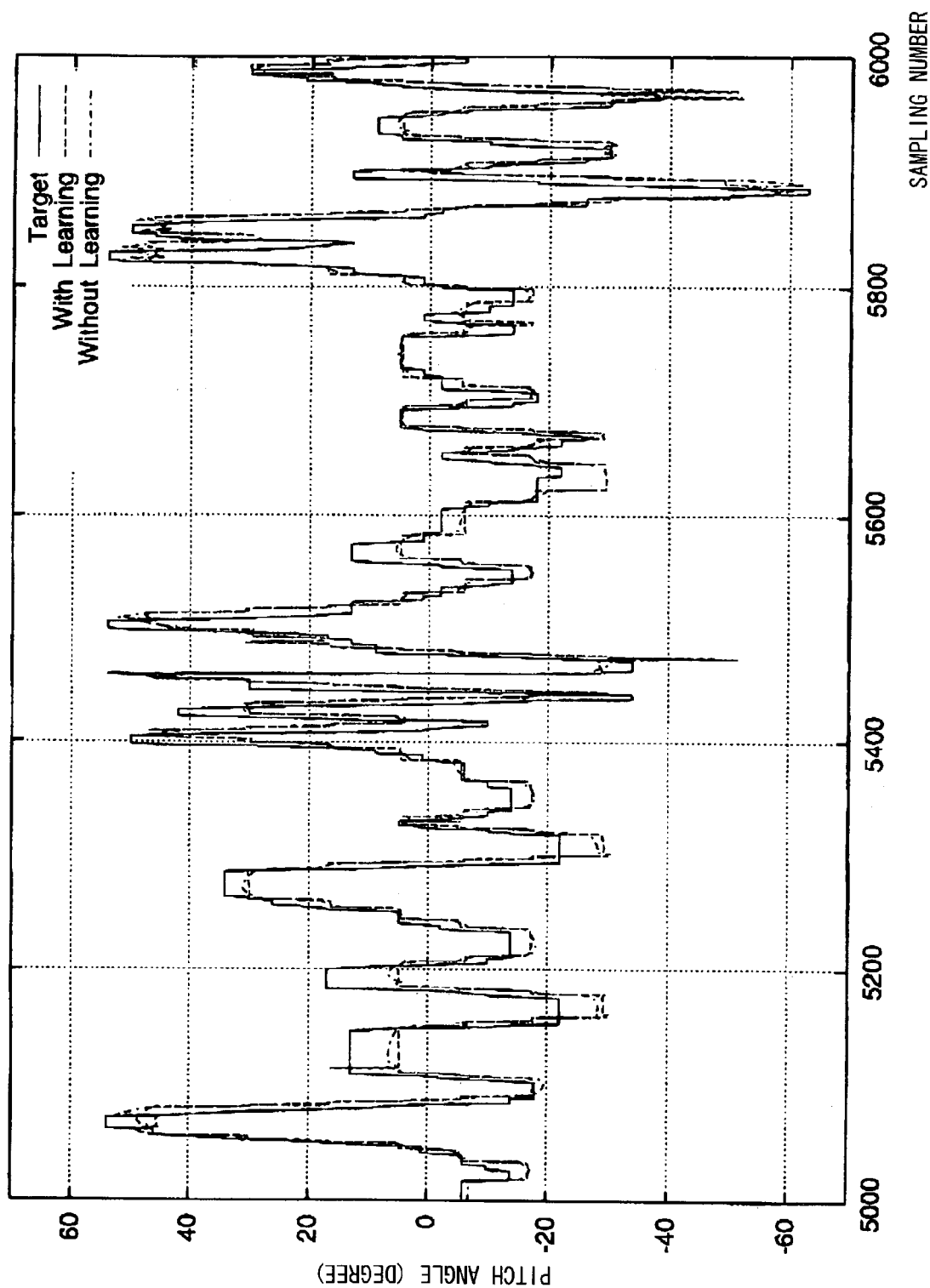
FIG. 11 is a chart indicating a result of the control by the behavior control apparatus of the invention.

FIG. 11 shows a result of the experiment where test patterns are provided to the system in FIG. 2. Lines in FIG. 12 indicate the target output (Target) which is a teacher signal, the output from the behavior control apparatus 108 after the third learning (with Learning), and the output from the behavior control apparatus 108 without going through the third learning (without Learning), respectively, as indicated in legend in graph. The horizontal axis of the graph represents the sampling number by the sensor 116, and the vertical axis represents the pitch angle of the helicopter 100. FIG. 11 shows that the output characteristic of the behavior control apparatus 108 differs more or less depending on the presence or absence of the third learning. While the output with the third learning presents a response characteristic like a step function, the output without the third learning presents a smooth response characteristic. Therefore, whether going through the third learning or not may be determined depending on a desired response characteristic.

In a layered neural network such as perceptron, it is general that inputs and outputs are directly used for learning. On the other hand, in the behavior control apparatus 108 of the invention, the distribution of inputs and outputs to classes based on a target output is conducted beforehand. Then, learning patterns are collected in each class where the patterns are distributed. Thus, since an output from classes other than the class where the learning pattern is distributed is not provided, no inappropriate or unexpected outputs are generated in response to inputs for which learning has not been conducted. Thus, the reliability of the control system is improved.

In addition, by creating an appropriate number of classes having an appropriate range according to the output distribution, an appropriate filtering can be applied to both a controlled object where outputs are concentrated around a certain value, and a controlled object where outputs are scattered across a wide range. Thus, the precision of the control is improved.

Figure 12A:
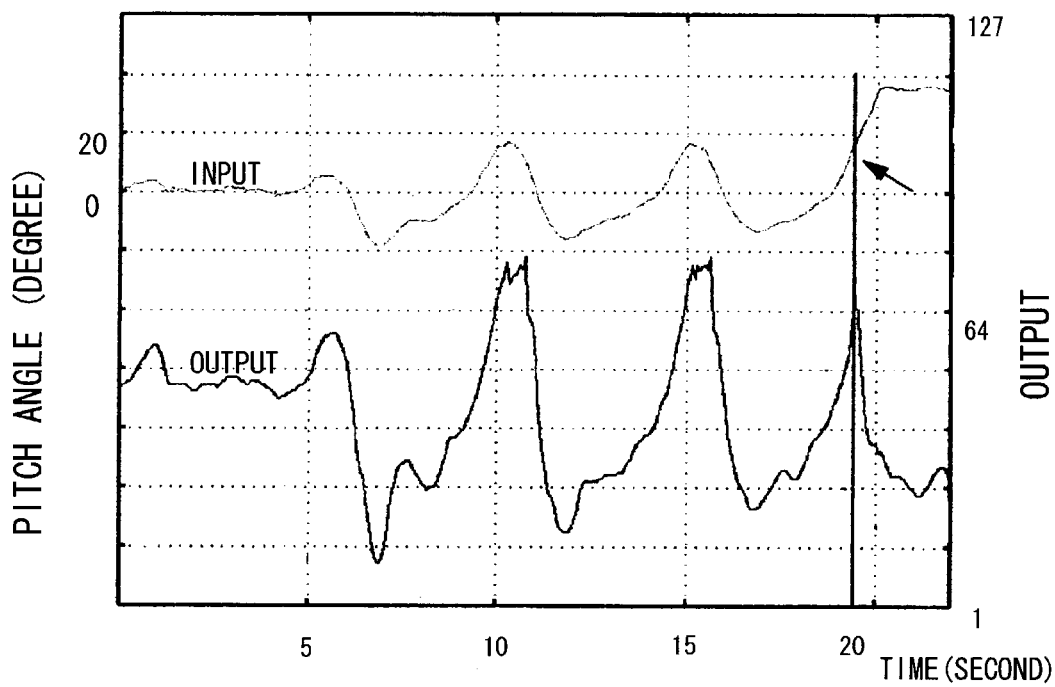
FIG. 12A is a chart indicating a result of controlling a helicopter by CMAC and FIG. 12B is a chart indicating a result of controlling the helicopter by the behavior control apparatus of the invention.
Figure 12B:
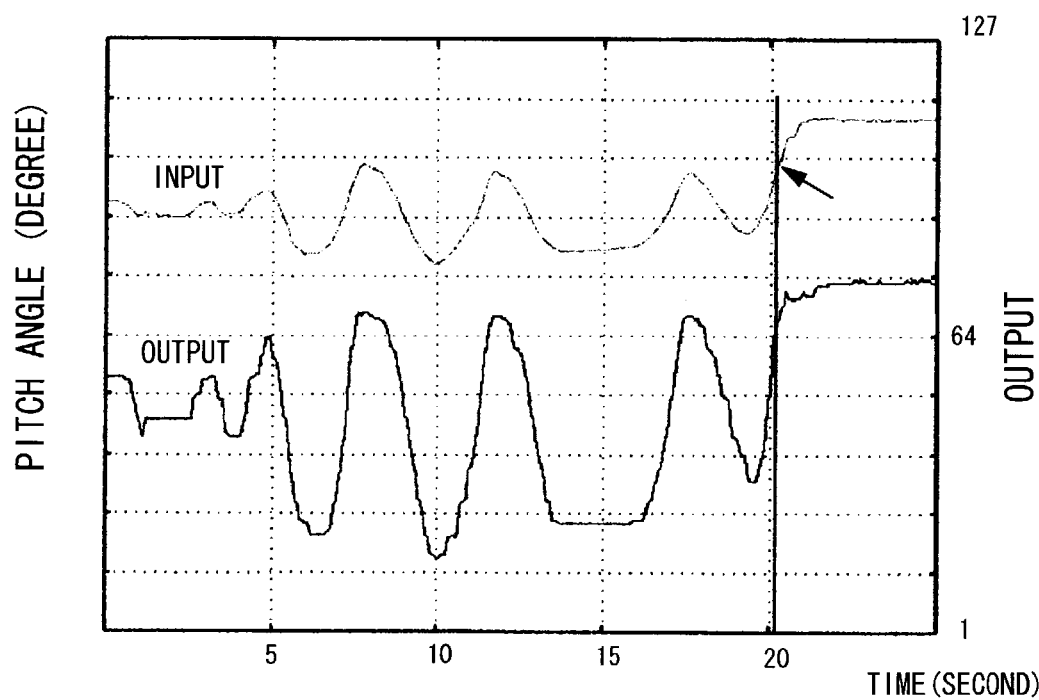

FIG. 12A shows a result of experiment when CMAC (cerebellar model arithmetic computer) is applied to a control system same as the system in FIG. 2, and FIG. 12B shows a result of experiment when the behavior control apparatus 108 of the invention is used for control. In each figure, an upper line indicates inputs (pitch angle) from the sensor 116, and a lower line indicates outputs generated by the behavior control apparatus 108. It is ideal that the output follows the sensor input. Referring to FIG. 12A of the system with CMAC, the output follows the input well while the sensor input is within the range where the learning has been conducted for the sensor inputs. However, the output takes inappropriate value while the sensor input gets into the range (indicated by an arrow) where the learning has not been conducted for the sensor inputs (the region where the pitch angle of the helicopter 100 is more than 20 degrees). In other words, although the control system had to increase outputs following increasing inputs, the system actually generates decreasing outputs. Referring to FIG. 12B, in contrast to the system in FIG. 12A, the behavior control system of the invention generates outputs following sensors input even when the sensor input gets into the range (indicated by an arrow) where the learning has not been conducted for the sensor inputs.

Figure 13:
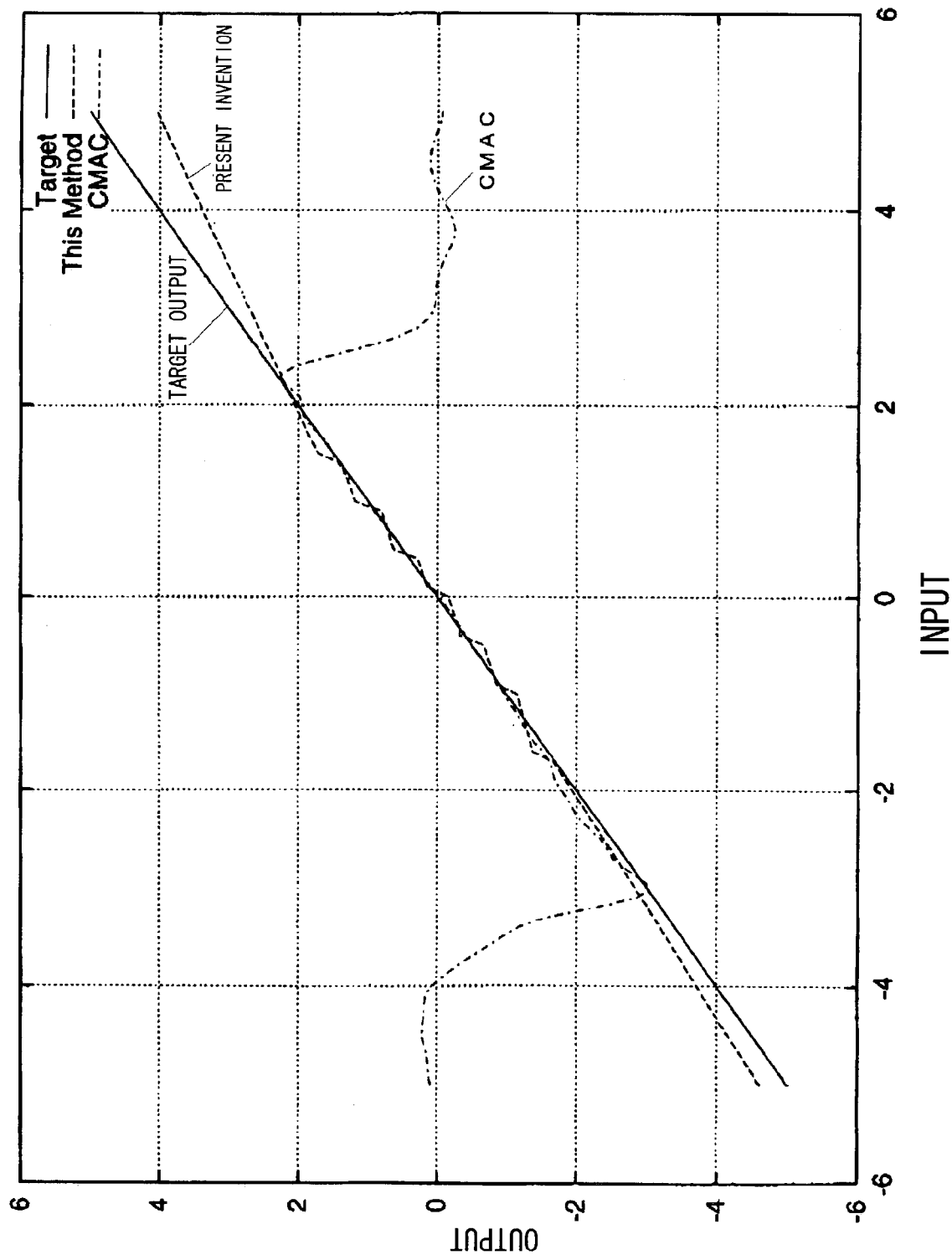
FIG. 13 is a chart for comparing the results in FIGS. 12A and 12B.

FIG. 13 is a graph showing normalized version of the results in both FIGS. 12A and 12B. The system with CMAC (FIG. 12A) fails to follow target output when the sensor input gets into the region where the learning has not been conducted (outside the input ranges from −3 to 2 in FIG. 13). On the other hand, the behavior control apparatus of the invention can follow the target output even though the sensor input gets into the same region.

RBF network also uses normal distribution for calculating an output same as one embodiment of the invention. In the RBF network, relationship between input and output may be represented by phase relationship of output functions in a class. Namely, calculation result for all classes is output by learning ratio of all classes for a certain input. On the other hand, since the behavior control apparatus of the invention calculates relationship between inputs and outputs in selected single class as well as output functions may be selected arbitrary in each class, it is not necessary to consider topology among the output functions and value of the selected single output function may be directly provided as an output.

More specifically with a simple example, it is assumed that there are class 1 and class 2, wherein the class 1 provides an output value "a" and the class 2 provides an output value "b" for inputs distributed to each class. In this case, output in response to a certain input generated by RBF network would be a linear combination of the output values from each class such as (a+b) or (a+b)/2. On the other hand, only the output value "b" from the class 2 is generated by the behavior control system of the invention if the class 2 becomes "Winner" for a certain input in its control stage. Thus, the present invention realizes precise control by creating a dedicated function in each class enables to approximate more complicated functions than RBF network does.

It should be noticed that the amount of calculation is substantially small in the control stage by the behavior control apparatus 108. Specifically, only the calculation of mean $m_i$ (Equation (2)) for determining to which class a test pattern is distributed and the calculation of output $y_k'$ (Equation (3)) in the class where a test pattern vector has been distributed are required in the control stage. This small amount of calculation means that the control becomes faster than a method of calculating normal distributions one by one. Thus, the behavior control apparatus may achieve a stable control even for a controlled object such as a helicopter by means of the high-speed processing.

According to the present invention, input patterns for learning (learning pattern vectors) are distributed to one of two or more classes based on a target output, and the correspondence between the input pattern for learning and the target output is learned only in a class where the input pattern is distributed in the preparation stage. Thereby the range of outputs calculated in response to a certain input pattern is limited in the control stage, so no unexpected output will be generated and consequently the reliability of the control is improved.

What is claimed is:

1. A behavior control apparatus comprising:
    an input unit for creating pairs of an input pattern vector for learning and a target output, wherein said input pattern vector for learning includes inputs detected by a sensor and outputs provided to a controlled object as its elements;
    a first distributing unit for distributing said pair of the input pattern vector for learning and the target output to one of two or more classes based on the target output;
    a learning unit for learning correspondence between each element in the input pattern vector for learning and the target output in the class where said pair of the input pattern vector and the target output are distributed by said first distributing unit;
    a second distributing unit for distributing new input pattern vector into one of said classes according to learning result in said learning unit; and
    an output processing unit for calculating an output provided to said controlled object and corresponding to said new input pattern vector according to said learning result in the class where said new input pattern vector is distributed by said second distributing unit, wherein the output processing unit calculates a weighted mean of distances between mean of each normal distribution in the class where said new input pattern vector is distributed and each element of said new test pattern vector, said output processing unit outputting a value at a distance corresponding to said weighted mean separated from said mean of the normal distribution of said target output.

2. A behavior control apparatus according to claim 1, wherein said two or more classes are created beforehand.

3. A behavior control apparatus according to claim 1, wherein said two or more classes are created automatically by self-organizing map method based on a density of distribution of said target output.

4. A behavior control apparatus according to claim 1, wherein said input pattern vector for learning includes as elements an input detected by the sensor and an output provided to the controlled object at a present time, and an input detected by the sensor and an output to the controlled object at a time preceding the present time.

5. A behavior control apparatus according to claim 1, wherein:
    said learning unit stores each element of said input pattern vectors for learning and said target outputs distributed to each class respectively, and then calculates mean and variance of normal distribution for each data set of said each element and said target output; and
    said second distributing unit calculates a distance from the mean of each normal distribution to each element of said new input pattern vector for all classes, and distributes said new input pattern vector to the class which yields smallest mean of the distances.

6. A behavior control apparatus according to claim 5, wherein said mean of the distances is a weighted mean using weights for each element of said input pattern vector for learning with respect to said target output.

7. A behavior control apparatus according to claim 6, wherein said weight is calculated based on learning with a neural network with said target output as a teacher signal.

8. A behavior control apparatus comprising:
    an input unit for creating pairs of an input pattern vector for learning and a target output, wherein said input pattern vector for learning includes inputs detected by a sensor and outputs provided to a controlled object as its elements;
    a first distributing unit for distributing said pair of the input pattern vector for learning and the target output to one of two or more classes based on the target output;
    a learning unit for learning correspondence between each element in the input pattern vector for learning and the target output in the class where said pair of the input pattern vector and the target output are distributed by said first distributing unit, said learning unit stores each element of said input pattern vectors for learning and said target outputs distributed to each class respectively, and then calculates mean and variance of normal distribution for each data set of said each element and target output;
    a second distributing unit for distributing new input pattern vector into one of said classes according to learning result in said learning unit, said second distributing unit calculates a distance from the mean of each normal distribution to each element of said new input pattern vector for all classes, and distributes said new input pattern vector to the class which yields smallest mean of the distances; and
    an output processing unit for calculating an output corresponding to said new input pattern vector according to said learning result in the class where said new input pattern vector is distributed by said second distributing unit, wherein the output is provided to said controlled object, wherein when each element of said new input pattern vector is represented as $X_{kj}$ (k=1, ..., K, j=1, ..., J), said target output is represented as $Y_k$, said output corresponding to said new input pattern vector is represented as $Y_k'$, said class is represented as i (i=1 to I), said mean and said variance of normal distribution of data set in class i are respectively represented as $\mu_{ij}$ and $\sigma_{ij}$, said weight is represented as $W_{ij}$ and said mean and said variance of normal distribution of said target output $y_k$ in class i are represented as $\mu_{y_i}$, $\sigma_{y_i}$, said second distributing unit calculates a distance $z_{ij}$ from said mean of normal distribution for each element $X_{kj}$ of said new input pattern vector according to following equation:

$$z_{ij}=(X_{kj}-\mu_{ij})/\sigma_{ij}(j=1,\ldots,J),$$

said second distributing unit calculating a weighted mean $m_i$ of said calculated distances $z_{ij}$ according to following equation:

$$m_i=\Sigma(z_{ij}w_{ij})/J\ (j=1,\ldots,J),$$

said second distributing unit distributing said new input pattern vector to the class which yields smallest weighted mean $m_i$; and said output processing unit calculates said output $y_k'$ for the class where said new input pattern vector is distributed according to following equation:

$$y_k' = m_i \cdot \sigma_{y_i} + \mu_{y_i}.$$

9. A behavior control method comprising:
creating pairs of an input pattern vector for learning and a target output, wherein said input pattern vector for learning includes inputs detected by a sensor and outputs provided to a controlled object as its elements;
distributing said pair of the input pattern vector for learning and the target output to one of two or more classes based on the target output;
learning correspondence between each element in the input pattern vector for learning and the target output in the class where said pair of the input pattern vector and the target output are distributed;
distributing new input pattern vector into one of said classes according to learning result in said learning step; and
calculating an output corresponding to said new input pattern vector according to said learning result in the class where said new input pattern vector is distributed, including calculating a weighted mean of distances between mean of each normal distribution in the class where said new input pattern vector is distributed and each element of said new test pattern vector, and outputting a value at a distance corresponding to said weighted mean separated from said mean of the normal distribution of said target output, and wherein the output is provided to said controlled object.

10. A behavior control method according to claim 9, wherein said two or more classes are created beforehand.

11. A behavior control method according to claim 9, wherein said two or more classes are created automatically by a self-organizing map method based on a density of distribution of said target output.

12. A behavior control method according to claim 9, wherein said input pattern vector for learning includes as elements an input detected by the sensor and an output provided to the controlled object at a present time, and an input detected by the sensor and an output to the controlled object at a time preceding the present time.

13. A behavior control method according to claim 9, wherein:
said step of learning includes storing each element of said input pattern vectors for learning and the target outputs distributed to each class respectively, and then calculating mean and variance of normal distribution for each data set of said each element and said target output; and
said step of distributing said new input pattern vector includes calculating a distance from the mean of each normal distribution to each element of said new input pattern vector for all classes, and distributing said new input pattern vector to the class which yields smallest mean of the distances.

14. A behavior control method according to claim 13, wherein said mean of the distances is a weighted mean using weights for each element of said input pattern vector for learning with respect to said target output.

15. A behavior control method according to claim 14, wherein said weight is calculated based on learning with a neural network with said target output as a teacher signal.

16. A behavior control method comprising:
creating pairs of an input pattern vector for learning and a target output, wherein said input pattern vector for learning includes inputs detected by a sensor and outputs provided to a controlled object as its elements;
distributing said pair of the input pattern vector for learning and the target output to one of two or more classes based on the target output;
learning correspondence between each element in the input pattern vector for learning and the target output in the class where said pair of the input pattern vector and the target output are distributed, the learning includes storing of each element of said input pattern vectors for learning and the target outputs distributed to each class respectively, and then calculating mean and variance of normal distribution for each data set of said each element and target output;
distributing new input pattern vector into one of said classes according to learning result in said learning step, and including calculating a distance from the mean of each normal distribution to each element of said new input pattern vector for all classes, and distributing new input pattern vector to the class which yields smallest mean of the distances;
calculating an output corresponding to said new input pattern vector according to said learning result in the class where said new input pattern vector is distributed, wherein when each element of said new input pattern vector is represented as $x_{kj}$ (k=1, ..., K, j=1, ..., J), said target output is represented as $y_k$, said output corresponding to said new input pattern vector is represented as $Y_k'$, said class is represented as i (i=1 to I), said mean and said variance of normal distribution of data set in class i are respectively represented as $\mu_{ij}$ and $\sigma_{ij}$, said weight is represented as $w_{ij}$, and said mean and said variance of normal distribution of said target output $y_k$ class i are represented as $\mu_{y_i}$, $\sigma_{y_i}$, said step of distributing said new input pattern vector includes calculating a distance $z_{ij}$ from said mean of normal distribution for each element $x_{kj}$ of said new input pattern vector according to following equation:

$$z_{ij}=(x_{kj}-\mu_{ij})/\sigma_{ij}(j=1,\ldots,J)$$

said step of distributing said new input pattern vector further including calculating a weighted mean $m_i$ of said calculated distances $z_{ij}$ according to following equation:

$$m_i = \Sigma(z_{ij} w_{ij})/J (j=1, \ldots, J), \text{ and}$$

said step of distributing said new input pattern vector further including distributing said new input pattern vector to the class which yields smallest weighted mean $m_i$, and said step of outputting includes calculating said output $y_k'$ for the class where said new input pattern vector is distributed according to following equation:

$$y_k' = m_i \cdot \sigma_{y_i} + \mu_{y_i}$$

and, wherein the output is provided to said controlled object.

* * * * *

UNITED STATES PATENT AND TRADEMARK OFFICE
CERTIFICATE OF CORRECTION

PATENT NO.       : 7,133,855 B2                          Page 1 of 1
APPLICATION NO.  : 10/411485
DATED            : November 7, 2006
INVENTOR(S)      : Yugo Ueda and Hiroshi Tsujino It is certified that error appears in the above-identified patent and that said Letters Patent is hereby corrected as shown below:

In column 14, line 61, please insert -- in -- before "class".

Signed and Sealed this

Twenty-second Day of May, 2007

JON W. DUDAS
*Director of the United States Patent and Trademark Office*